US010363958B2

(12) United States Patent
Otto et al.

(10) Patent No.: US 10,363,958 B2
(45) Date of Patent: Jul. 30, 2019

(54) ELECTRIC POWER STEERING MODE DETERMINATION AND TRANSITIONING

(71) Applicant: STEERING SOLUTIONS IP HOLDING CORPORATION, Saginaw, MI (US)

(72) Inventors: Jeffrey M. Otto, Bay City, MI (US); Rangarajan Ramanujam, Saginaw, MI (US); Bhuvanesh Sainath, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 73 days.

(21) Appl. No.: 15/656,075

(22) Filed: Jul. 21, 2017

(65) Prior Publication Data
US 2018/0029640 A1 Feb. 1, 2018

Related U.S. Application Data

(60) Provisional application No. 62/366,668, filed on Jul. 26, 2016.

(51) Int. Cl.
| | |
|---|---|
| *B62D 15/02* | (2006.01) |
| *B62D 5/04* | (2006.01) |
| *B62D 6/08* | (2006.01) |
| *G05D 1/02* | (2006.01) |
| *B62D 1/28* | (2006.01) |
| *B62D 6/00* | (2006.01) |

(52) U.S. Cl.
CPC ........... *B62D 15/025* (2013.01); *B62D 1/286* (2013.01); *B62D 5/0463* (2013.01); *B62D 6/007* (2013.01); *B62D 6/08* (2013.01); *G05D 1/021* (2013.01)

(58) Field of Classification Search
CPC .... B62D 15/025; B62D 1/286; B62D 5/0463; B62D 6/007; B62D 6/08; G05D 1/021
See application file for complete search history.

(56) References Cited

U.S. PATENT DOCUMENTS

| | | |
|---|---|---|
| 1,795,567 A | 3/1931 | Maurice |
| 3,369,425 A | 2/1968 | Runkle et al. |
| 3,386,309 A | 6/1968 | Reed et al. |

(Continued)

FOREIGN PATENT DOCUMENTS

| | | |
|---|---|---|
| CN | 1449952 A | 10/2003 |
| CN | 1550395 A | 12/2004 |

(Continued)

OTHER PUBLICATIONS

China Patent Application No. 201510204221.5 Second Office Action dated Mar. 10, 2017, 8 pages.

(Continued)

*Primary Examiner* — Tyler J Lee

(57) ABSTRACT

Technical solutions are described for facilitating an electric power steering (EPS) system to determine an operating mode of a vehicle that is equipped with the EPS, where the operating mode is indicative of a level of autonomous driving being used by the vehicle. The technical solutions further facilitate detecting a change in the operating mode of the vehicle, and facilitating a transition in computing an assist signal for the EPS system during the transition between the operating modes.

18 Claims, 11 Drawing Sheets

(56) References Cited

U.S. PATENT DOCUMENTS

| | | | |
|---|---|---|---|
| 3,396,600 A | 8/1968 | Zeigler et al. |
| 3,782,492 A | 1/1974 | Hollins |
| 4,138,167 A | 2/1979 | Ernst et al. |
| 4,315,117 A | 2/1982 | Kokubo et al. |
| 4,337,967 A | 7/1982 | Yoshida et al. |
| 4,476,954 A | 10/1984 | Johnson et al. |
| 4,503,300 A | 3/1985 | Lane, Jr. |
| 4,503,504 A | 3/1985 | Suzumura et al. |
| 4,509,386 A | 4/1985 | Kimberlin |
| 4,535,645 A | 8/1985 | De Bisschop et al. |
| 4,559,816 A | 12/1985 | Ebert et al. |
| 4,561,323 A | 12/1985 | Stromberg |
| 4,570,776 A | 2/1986 | Iwashita et al. |
| 4,598,604 A | 7/1986 | Sorsche et al. |
| 4,602,520 A | 7/1986 | Nishikawa et al. |
| 4,633,732 A | 1/1987 | Nishikawa et al. |
| 4,661,752 A | 4/1987 | Nishikawa et al. |
| 4,669,325 A | 6/1987 | Nishikawa et al. |
| 4,691,587 A | 9/1987 | Farrand et al. |
| 4,785,684 A | 11/1988 | Nishikawa et al. |
| 4,811,580 A | 3/1989 | Jang |
| 4,836,566 A | 6/1989 | Birsching |
| 4,881,020 A | 11/1989 | Hida et al. |
| 4,893,518 A | 1/1990 | Matsumoto et al. |
| 4,901,544 A | 2/1990 | Jang |
| 4,901,593 A | 2/1990 | Ishikawa |
| 4,921,066 A | 5/1990 | Conley |
| 4,941,679 A | 7/1990 | Baumann et al. |
| 4,943,028 A | 7/1990 | Hoffmann et al. |
| 4,962,570 A | 10/1990 | Hosaka et al. |
| 4,967,618 A | 11/1990 | Matsumoto et al. |
| 4,976,239 A | 12/1990 | Hosaka |
| 5,048,364 A | 9/1991 | Minamoto et al. |
| 5,226,853 A | 7/1993 | Courgeon |
| 5,240,284 A | 8/1993 | Takada et al. |
| 5,295,712 A | 3/1994 | Omura |
| 5,311,432 A | 5/1994 | Momose |
| 5,319,803 A | 6/1994 | Allen |
| 5,428,873 A | 7/1995 | Hitchcock et al. |
| 5,488,555 A | 1/1996 | Asgari |
| 5,590,565 A | 1/1997 | Palfenier et al. |
| 5,606,892 A | 3/1997 | Hedderly |
| 5,613,404 A | 3/1997 | Lykken et al. |
| 5,618,058 A | 4/1997 | Byon |
| 5,668,721 A | 9/1997 | Chandy |
| 5,678,454 A | 10/1997 | Cartwright et al. |
| 5,690,362 A | 11/1997 | Peitsmeier et al. |
| 5,737,971 A | 4/1998 | Riefe et al. |
| 5,765,116 A | 6/1998 | Wilson-Jones et al. |
| 5,813,699 A | 9/1998 | Donner et al. |
| 5,890,397 A | 4/1999 | Stoner et al. |
| 5,893,580 A | 4/1999 | Hoagland et al. |
| 5,911,789 A | 6/1999 | Keipert et al. |
| 5,931,250 A | 8/1999 | Kagawa et al. |
| 5,941,130 A | 8/1999 | Olgren et al. |
| 6,041,677 A | 3/2000 | Reh et al. |
| 6,070,686 A | 6/2000 | Pollmann |
| 6,079,513 A | 6/2000 | Nishizaki et al. |
| 6,142,523 A | 11/2000 | Bathis et al. |
| 6,170,862 B1 | 1/2001 | Hoagland et al. |
| 6,220,630 B1 | 4/2001 | Sundholm et al. |
| 6,227,571 B1 | 5/2001 | Sheng et al. |
| 6,234,040 B1 | 5/2001 | Weber et al. |
| 6,264,239 B1 | 7/2001 | Link |
| 6,301,534 B1 | 10/2001 | McDermott, Jr. |
| 6,343,993 B1 | 2/2002 | Duval et al. |
| 6,354,622 B1 | 3/2002 | Ulbrich et al. |
| 6,354,626 B1 | 3/2002 | Cartwright |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,460,427 B1 | 10/2002 | Hedderly |
| 6,571,587 B2 | 6/2003 | Dimig et al. |
| 6,578,449 B1 | 6/2003 | Anspaugh et al. |
| 6,611,745 B1 | 8/2003 | Paul |
| 6,612,198 B2 | 9/2003 | Rouleau et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,025,380 B2 | 4/2006 | Arihara |
| 7,048,305 B2 | 5/2006 | Muller |
| 7,062,365 B1 | 6/2006 | Fei |
| 7,140,213 B2 | 11/2006 | Feucht et al. |
| 7,159,904 B2 | 1/2007 | Schafer et al. |
| 7,213,842 B2 | 5/2007 | Uehle et al. |
| 7,258,365 B2 | 8/2007 | Kahlenberg et al. |
| 7,261,014 B2 | 8/2007 | Arihara |
| 7,290,800 B2 | 11/2007 | Schwarzbich et al. |
| 7,295,904 B2 | 11/2007 | Kanevsky et al. |
| 7,308,964 B2 | 12/2007 | Hara et al. |
| 7,410,190 B2 | 8/2008 | Sawada et al. |
| 7,428,944 B2 | 9/2008 | Gerum |
| 7,461,863 B2 | 12/2008 | Muller |
| 7,495,584 B1 | 2/2009 | Sorensen |
| 7,533,594 B2 | 5/2009 | Menjak et al. |
| 7,628,244 B2 | 12/2009 | Chino et al. |
| 7,719,431 B2 | 5/2010 | Bolourchi |
| 7,735,405 B2 | 6/2010 | Parks |
| 7,758,073 B1 | 7/2010 | Chou |
| 7,775,129 B2 | 8/2010 | Oike et al. |
| 7,784,830 B2 | 8/2010 | Ulintz |
| 7,793,980 B2 | 9/2010 | Fong |
| 7,862,079 B2 | 1/2011 | Fukawatase et al. |
| 7,975,569 B2 | 1/2011 | Klos |
| 7,894,951 B2 | 2/2011 | Norris et al. |
| 7,909,361 B2 | 3/2011 | Oblizajek et al. |
| 7,913,803 B2 * | 3/2011 | Hidaka ............... B62D 15/025 180/443 |
| 8,002,075 B2 | 8/2011 | Markfort |
| 8,011,265 B2 | 9/2011 | Menjak et al. |
| 8,021,235 B2 | 9/2011 | Tinnin et al. |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,161,839 B2 | 4/2012 | Warashina |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,466,382 B2 | 6/2013 | Donicke |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,733,201 B2 | 5/2014 | Okano et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,955,407 B2 | 2/2015 | Sakuma |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,039,041 B2 | 5/2015 | Buzzard et al. |
| 9,045,078 B2 | 6/2015 | Tovar et al. |
| 9,073,574 B2 | 7/2015 | Cuddihy et al. |
| 9,080,895 B2 | 7/2015 | Martin et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |

(56) References Cited

U.S. PATENT DOCUMENTS

| | | |
|---|---|---|
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Yamaguchi |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,296,410 B2 | 3/2016 | Isogai et al. |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,108 B2 | 6/2016 | Pfenninger et al. |
| 9,360,865 B2 | 6/2016 | Yopp |
| 9,421,994 B2 | 8/2016 | Agbor et al. |
| 9,487,228 B2 | 11/2016 | Febre et al. |
| 9,550,514 B2 | 1/2017 | Schulz et al. |
| 9,616,914 B2 | 4/2017 | Stinebring et al. |
| 9,643,641 B1 | 5/2017 | Stinebring et al. |
| 9,663,136 B2 | 5/2017 | Stinebring et al. |
| 9,744,983 B2 | 8/2017 | Stinebring et al. |
| 9,828,016 B2 | 11/2017 | Lubischer |
| 9,845,106 B2 | 12/2017 | Bodtker |
| 9,849,904 B2 | 12/2017 | Rouleau |
| 9,862,403 B1 | 1/2018 | Rouleau et al. |
| 9,919,724 B2 | 3/2018 | Lubischer et al. |
| 10,065,655 B2 | 9/2018 | Bendewald et al. |
| 10,131,375 B2 | 11/2018 | Schmidt et al. |
| 2002/0171235 A1 | 11/2002 | Riefe et al. |
| 2003/0046012 A1 | 3/2003 | Yamaguchi |
| 2003/0094330 A1 | 5/2003 | Boloorchi et al. |
| 2003/0146037 A1 | 8/2003 | Menjak et al. |
| 2003/0183440 A1 | 10/2003 | Thomas et al. |
| 2003/0188598 A1 | 10/2003 | Cartwright |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1 | 3/2004 | Riefe |
| 2004/0099083 A1 | 5/2004 | Choi et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0242562 A1 | 11/2005 | Ridgway et al. |
| 2005/0263996 A1 | 12/2005 | Manwaring et al. |
| 2005/0275205 A1 | 12/2005 | Ahnafield |
| 2006/0005658 A1 | 1/2006 | Armstrong et al. |
| 2006/0186658 A1 | 8/2006 | Yasuhara et al. |
| 2006/0202463 A1 | 9/2006 | Schwarzbich et al. |
| 2006/0219499 A1 | 10/2006 | Organek |
| 2006/0224287 A1 | 10/2006 | Izawa et al. |
| 2006/0237959 A1 | 10/2006 | Dimig et al. |
| 2006/0244251 A1 | 11/2006 | Muller |
| 2006/0283281 A1 | 12/2006 | Li et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito et al. |
| 2007/0096446 A1 | 5/2007 | Breed |
| 2007/0126222 A1 | 6/2007 | Koya et al. |
| 2007/0158116 A1 | 7/2007 | Peppler |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0028884 A1 | 2/2008 | Monash |
| 2008/0047382 A1 | 2/2008 | Tomaru et al. |
| 2008/0079253 A1 | 4/2008 | Sekii et al. |
| 2008/0147276 A1 | 6/2008 | Pattok et al. |
| 2008/0216597 A1 | 9/2008 | Iwakawa et al. |
| 2008/0238068 A1 | 10/2008 | Kumar et al. |
| 2008/0264196 A1 | 10/2008 | Schindler et al. |
| 2009/0024278 A1 | 1/2009 | Kondo et al. |
| 2009/0056493 A1 | 3/2009 | Dubay et al. |
| 2009/0107284 A1 | 4/2009 | Lucas et al. |
| 2009/0229400 A1 | 9/2009 | Ozsoylu et al. |
| 2009/0256342 A1 | 10/2009 | Cymbal et al. |
| 2009/0266195 A1 | 10/2009 | Tanke et al. |
| 2009/0276111 A1 | 11/2009 | Wang et al. |
| 2009/0280914 A1 | 11/2009 | Kakutani et al. |
| 2009/0292466 A1 | 11/2009 | McCarthy et al. |
| 2010/0152952 A1 | 6/2010 | Lee et al. |
| 2010/0218637 A1 | 9/2010 | Barroso |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2011/0314954 A1 | 12/2011 | Matsuno et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2012/0247259 A1 | 10/2012 | Mizuno et al. |
| 2012/0287050 A1 | 11/2012 | Wu |
| 2013/0002416 A1 | 1/2013 | Gazit |
| 2013/0325202 A1 | 1/2013 | Howard et al. |
| 2013/0087006 A1 | 4/2013 | Ohtsubo et al. |
| 2013/0104689 A1 | 5/2013 | Marutani et al. |
| 2013/0133463 A1 | 5/2013 | Moriyama |
| 2013/0158771 A1 | 6/2013 | Kaufmann |
| 2013/0174686 A1 | 7/2013 | Hirche et al. |
| 2013/0199866 A1 | 8/2013 | Yamamoto et al. |
| 2013/0205933 A1 | 8/2013 | Moriyama |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0325264 A1 | 12/2013 | Alcazar et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0300479 A1 | 4/2014 | Wolter et al. |
| 2014/0116187 A1 | 5/2014 | Tinnin |
| 2014/0137694 A1 | 5/2014 | Sugiura |
| 2014/0277896 A1 | 9/2014 | Lathrop et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer et al. |
| 2015/0051780 A1 | 1/2015 | Hahne |
| 2015/0120142 A1 | 1/2015 | Park et al. |
| 2015/0060185 A1 | 3/2015 | Feguri |
| 2015/0246673 A1 | 4/2015 | Tseng et al. |
| 2015/0137492 A1 | 5/2015 | Rao et al. |
| 2015/0203145 A1 | 7/2015 | Sugiura et al. |
| 2015/0203149 A1* | 7/2015 | Katayama ............... B62D 5/003 701/41 |
| 2015/0210273 A1 | 7/2015 | Kaufmann et al. |
| 2015/0251666 A1 | 7/2015 | Attard et al. |
| 2015/0283998 A1 | 9/2015 | Lind et al. |
| 2015/0324111 A1 | 9/2015 | Jubner et al. |
| 2015/0375769 A1 | 12/2015 | Abboud et al. |
| 2016/0009332 A1 | 1/2016 | Sirbu |
| 2016/0016604 A1 | 1/2016 | Johta et al. |

(56) References Cited

U.S. PATENT DOCUMENTS

| | | |
|---|---|---|
| 2016/0075371 A1 | 3/2016 | Varunkikar et al. |
| 2016/0082867 A1 | 3/2016 | Sugioka et al. |
| 2016/0200246 A1 | 3/2016 | Lisseman et al. |
| 2016/0114828 A1 | 4/2016 | Tanaka et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0244070 A1 | 8/2016 | Bendewald et al. |
| 2016/0244086 A1 | 8/2016 | Moriyama |
| 2016/0252133 A1 | 9/2016 | Caverly |
| 2016/0318540 A1 | 11/2016 | King |
| 2016/0318542 A1 | 11/2016 | Pattok et al. |
| 2016/0347347 A1 | 12/2016 | Lubischer et al. |
| 2016/0347348 A1 | 12/2016 | Lubischer et al. |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375770 A1 | 12/2016 | Ryne et al. |
| 2016/0375860 A1 | 12/2016 | Lubischer |
| 2016/0375923 A1 | 12/2016 | Schulz |
| 2016/0375924 A1 | 12/2016 | Bodtker et al. |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer et al. |
| 2017/0029009 A1 | 2/2017 | Rouleau |
| 2017/0029018 A1 | 2/2017 | Lubischer et al. |
| 2017/0097071 A1 | 4/2017 | Galehr |
| 2017/0106894 A1 | 4/2017 | Bodtker |
| 2017/0106895 A1 | 4/2017 | Jager et al. |
| 2017/0113589 A1 | 4/2017 | Riefe |
| 2017/0113712 A1 | 4/2017 | Watz |
| 2017/0151975 A1 | 7/2017 | Schmidt et al. |
| 2017/0294120 A1 | 10/2017 | Ootsuji |
| 2017/0297606 A1 | 10/2017 | Kim et al. |
| 2017/0361863 A1 | 12/2017 | Rouleau |
| 2017/0369091 A1 | 12/2017 | Nash |
| 2018/0029628 A1 | 2/2018 | Sugishita |
| 2018/0050720 A1 | 2/2018 | King et al. |
| 2018/0079441 A1 | 3/2018 | McKinzie et al. |
| 2018/0086378 A1 | 3/2018 | Bell et al. |
| 2018/0111639 A1 | 4/2018 | Bodtker et al. |
| 2018/0148084 A1 | 5/2018 | Nash et al. |
| 2018/0154932 A1 | 6/2018 | Rakouth et al. |
| 2018/0229753 A1 | 8/2018 | Magnus et al. |
| 2018/0238400 A1 | 8/2018 | Magnus et al. |
| 2018/0251147 A1 | 9/2018 | Heitz et al. |
| 2018/0273081 A1 | 9/2018 | Lubischer et al. |

FOREIGN PATENT DOCUMENTS

| | | |
|---|---|---|
| CN | 1722030 A | 1/2006 |
| CN | 1736786 A | 2/2006 |
| CN | 101037117 A | 9/2007 |
| CN | 101041355 A | 9/2007 |
| CN | 101049814 A | 10/2007 |
| CN | 101291840 A | 10/2008 |
| CN | 101402320 A | 4/2009 |
| CN | 101596903 A | 12/2009 |
| CN | 201534560 U | 7/2010 |
| CN | 101954862 A | 1/2011 |
| CN | 102161346 A | 8/2011 |
| CN | 102452391 A | 5/2012 |
| CN | 102523738 A | 6/2012 |
| CN | 102574545 B | 7/2012 |
| CN | 202337282 U | 7/2012 |
| CN | 102806937 A | 12/2012 |
| CN | 103085854 A | 5/2013 |
| CN | 103419840 A2 | 12/2013 |
| CN | 103448785 A | 12/2013 |
| CN | 103569185 A | 2/2014 |
| CN | 103587571 A | 2/2014 |
| CN | 203793405 U | 8/2014 |
| CN | 204222957 U | 3/2015 |
| DE | 4310431 A1 | 10/1994 |
| DE | 19523214 A1 | 1/1997 |
| DE | 19923012 A1 | 11/2000 |
| DE | 19954505 A1 | 5/2001 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 1020081057313 A1 | 10/2009 |
| DE | 102010025197 A1 | 12/2011 |
| DE | 102013110865 A1 | 4/2015 |
| DE | 102015216326 B4 | 9/2016 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S58191668 A | 11/1983 |
| JP | 60164629 A | 8/1985 |
| JP | S60157963 A | 8/1985 |
| JP | H05162652 A | 6/1993 |
| JP | 2007253809 A | 10/2007 |
| JP | 2012201334 A | 10/2012 |
| KR | 20100063433 A | 6/2010 |
| KR | 101062339 B1 | 9/2011 |
| WO | 2006099483 A1 | 9/2006 |
| WO | 2010082394 A1 | 7/2010 |
| WO | 2010116518 A1 | 10/2010 |
| WO | 2014208573 A1 | 12/2014 |

OTHER PUBLICATIONS

CN OA dated Oct. 27, 2017.
CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated: Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.

(56) References Cited

OTHER PUBLICATIONS

Partial European Search Report for related European Patent Application No. 14156903.8, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
English translation regarding DE102015216326B4, ThyssenKrupp AG; 21 pgs.
Chinese Office Action & Search Report for Chinese Application No. 2016103666609.X dated Dec. 20, 2017, including English Translation, 16 pages.
Chinese Office Action & Search Report for Chinese Application No. 201610427896.0 dated Oct. 27, 2017, 16 pages, English Translation Included.
Chinese Office Action & Search Report for Chinese Application No. 201610609647.3 dated Mar. 12, 2018, 5 pages, no English translation available.
Chinese Office Action & Search Report for Chinese Application No. 201610620335.2 dated Jan. 22, 2018, 15 pages, English Translation Included.
Chinese Office Action & Search Report for Chinese Application No. 201610642300.9 dated Feb. 7, 2018, 22 pages, English Translation Only.
Chinese Office Action & Search Report for Chinese Application No. 201610651953.3 dated Jan. 25, 2018, 12 pages, English Translation Included.
Chinese Office Action & Search Report for Chinese Application No. 201610830808.1 dated Apr. 3, 2018, 30 pages, English Translation Included.
Chinese Office Action & Search Report for Chinese Application No. 201610830809.6 dated Mar. 12, 2018, 11 pages, English Translation Included.
Chinese Office Action & Search Report for Chinese Application No. 201610830810.9 dated Jan. 31, 2018, 18 pages, English Translation Included.
Chinese Office Action & Search Report for Chinese Application No. 201611113746.9 dated May 4, 2018, 11 pages, English Translation Included.
Chinese Office Action for Chinese Application No. 201610427896.0 dated May 28, 2018 16 pages, English Translation Included.
CN Chinese Office Action & Search Report for Chinese Application No. 201610620335.2 dated Aug. 7, 2018, 16 pages, English Translation Included.

* cited by examiner

| | | | | | |
|---|---|---|---|---|---|
| SAE | NO AUTOMATION (LEVEL 0) | DRIVER ASSISTANCE (LEVEL 1) | PARTIAL AUTOMATION (LEVEL 2) | CONDITIONAL AUTOMATION (LEVEL 3) | HIGH AUTOMATION (LEVEL 4) | FULL AUTOMATION (LEVEL 5) |
| BASt | DRIVER ONLY | ASSISTED | PARTLY AUTOMATED | HIGHLY AUTOMATED | FULLY AUTOMATED | (NOT ADDRESSED) |
| NHTSA | NO AUTOMATION (LEVEL 0) | FUNCTION SPECIFIC AUTOMATION (LEVEL 1) | COMBINED FUNCTION AUTOMATION (LEVEL 2) | LIMITED SELF-DRIVING AUTOMATION (LEVEL 3) | FULL SELF-DRIVING AUTOMATION (LEVEL 4) | |

ELECTRIC POWER STEERING MODE DETERMINATION AND TRANSITIONING

CROSS-REFERENCES TO RELATED APPLICATIONS

This patent application claims priority to U.S. Provisional Patent Application Ser. No. 62/366,668, filed Jul. 26, 2016, which is incorporated herein by reference in its entirety.

BACKGROUND

The present application generally relates to electric power steering (EPS) systems, and particularly to EPS with advanced driver assist systems (ADAS).

The Society of Automotive Engineers (SAE) in SAE Standard J3016 has defined six levels of driving automation: 0 (no automation), 1 (driver assistance), 2 (partial automation), 3 (conditional automation), 4 (high automation), and 5 (full automation). For example, FIG. 1 depicts some of the example levels determined in the SAE J3016 standards. SAE Level 3 autonomy requires that execution of and monitoring of (the) driving environment be handled by a system while the fallback performance of dynamic driving tasks be the responsibility of a human driver. As ADAS transform the auto-industry, EPS systems are adapting to accommodate that market segment. For example, EPS systems are desired that support use cases that are SAE Level 3 compatible in the short-term, which eventually operate in Level 4, the levels being those determined by the SAE J3016 standards related to on-road motor vehicle automated driving systems.

Accordingly, it is desirable to develop EPS systems that are compatible with the proposed standards. For example, it is desirable that the EPS system determine a mode of operation between a highly automated operating mode and a fully automated operating mode. Further, it is desirable that the EPS system hardware be controllable to handle inertial effects of steering wheel that is no longer in use in the fully automated operating mode. Further yet, it is desirable that EPS systems monitor and record diagnostics appropriately, for example torque sensor faults, which are unique per mode of operation.

SUMMARY

One or more embodiments are described for an electric power steering system that includes an advance driver assist module. The advance driver assist module determines an operation mode that indicates a level of autonomous driving, the operation mode being a first operation mode. The advance driver assist module further detects a change from the first operation mode to a second operation mode. Further, the advance driver assist module transitions performance of the electric power steering system from the first operation mode to the second operation mode.

Further, one or more embodiments are also described of an advance driver assist module for an electric power steering system. The advance driver assist module determines an operation mode that indicates a level of autonomous driving, the operation mode being a first operation mode. The advance driver assist module detects a change from the first operation mode to a second operation mode. Further, the advance driver assist module transitions performance of the electric power steering system from the first operation mode to the second operation mode.

Further, one or more embodiments of a method for providing assist signal to an electric power steering system are described. The method includes determining an operation mode of the electric power steering system, the operation mode indicates a level of autonomous driving of a vehicle equipped with the electric power steering system, wherein the operation mode is a first operation mode. The method further includes detecting a change from the first operation mode to a second operation mode. The method further includes transitioning performance of the electric power steering system from the first operation mode to the second operation mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 illustrates a comparison between the levels in different standards.

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The technical solutions herein facilitate an EPS system that is compatible with multiple levels of proposed standards for ADAS, particularly compatible with Level 3 and further of the SAE J3016 standards. For example, the technical solutions facilitate the EPS system to determine a mode of operation for example, between driver-fallback (Level 3) and highly autonomous (Level 4+). Further, the technical solutions facilitate handling inertial effects of steering wheel in modes that are highly autonomous. Additionally, the technical solutions facilitate recording diagnostics, for example torque sensor faults, which are unique per mode of operation.

It should be noted that although the current document refers to the SAE J3016 standards and terms, the technical solutions herein are applicable to vehicles that use other standards such as Federal Highway Research Institute (BASt) and National Highway Traffic Safety Administration (NHTSA) standards that address similar cases as the SAE standards possibly using different terms. For example, refer to FIG. 2 that illustrates a comparison between the levels in such standards.

In case of the ADAS vehicles, as the level of automation increases, a human driver or operator of the vehicle 10 becomes less involved with vehicle (steering) control, and the added human sense of failure detection is also displaced. The technical solutions herein facilitate determining which modes of operation the vehicle is operating in, such as driver-based and highly autonomous, and accordingly facilitates transitioning the EPS system from one mode to another. Further, in driver-involved modes of operation, the EPS system provides various feedback to the driver to facilitate the driver to take actions in response to the driving conditions. Such feedback may not be provided, replaced with other types of feedback, in highly-autonomous mode. Further, monitoring diagnostic conditions varies between the operating modes, which the technical solutions herein facilitate the EPS system to perform.

Figure 1:
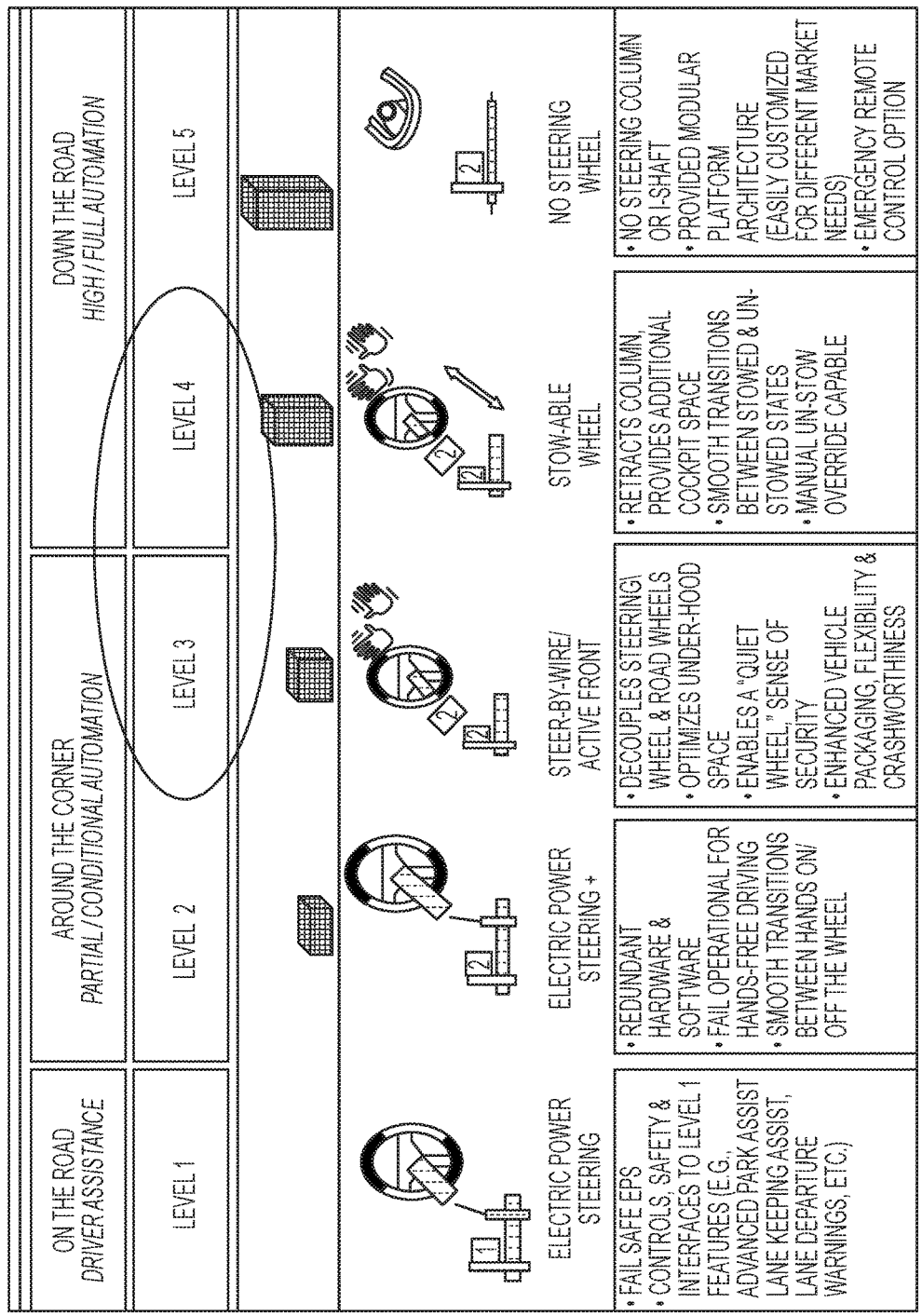
FIG. 1 depicts example levels determined in the SAE J3016 standards.
Figure 3:
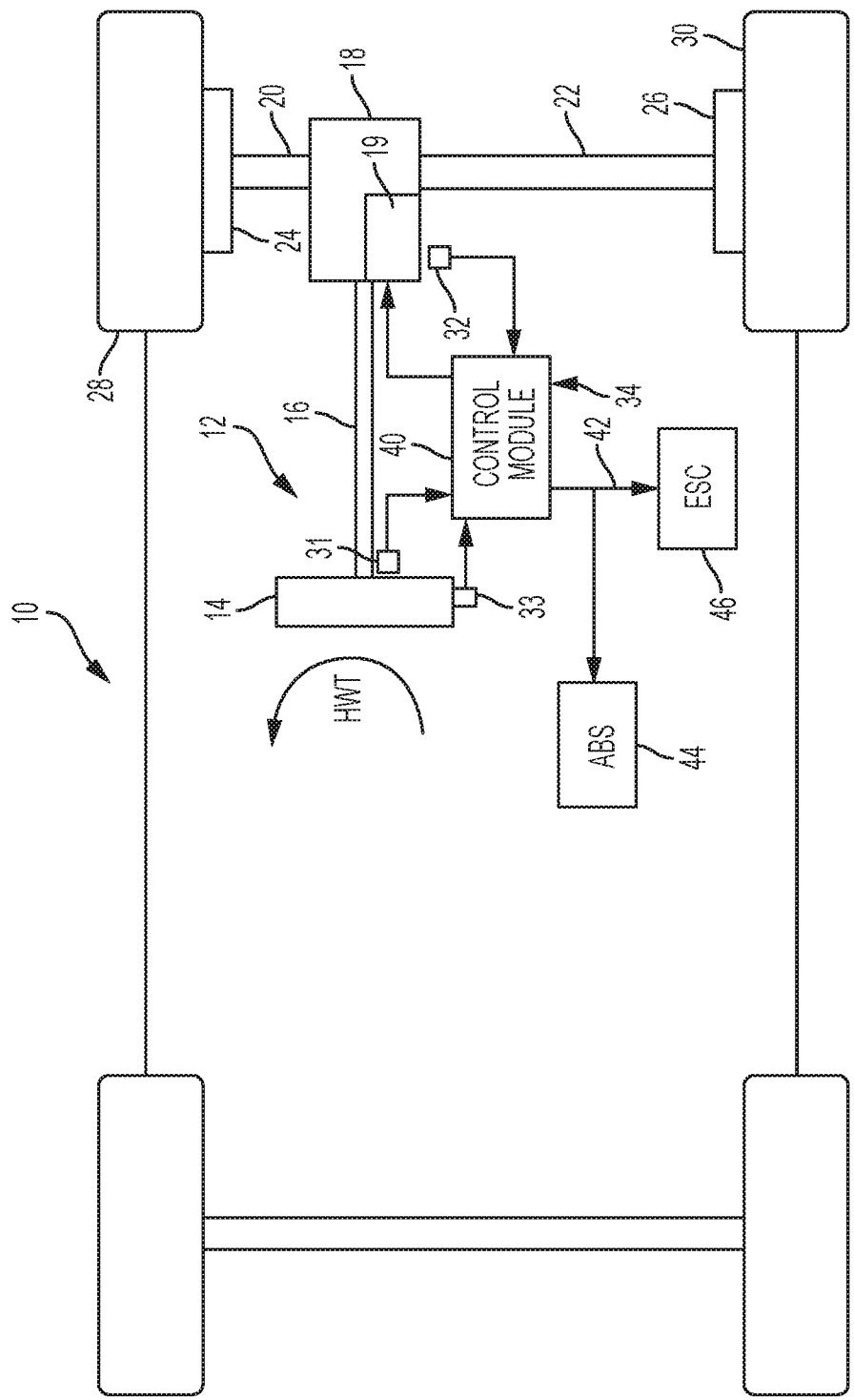
FIG. 3 illustrates an exemplary embodiment of a vehicle including a steering system.

FIG. 3 is an exemplary embodiment of a vehicle 10 including a steering system 12. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 3, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

In case of the ADAS vehicles, as a human driver or operator of the vehicle 10 becomes less involved with vehicle (steering) control, the added human sense of failure detection is also displaced. For electro-mechanical systems like the EPS 12, the reliance on the driver's perceptions as a detection mechanism (such as noise) prior to failure is leveraged during the design phase of the EPS 12 to classify failure mode severity. As noted, Level 3 autonomy requires that execution of and monitoring of (the) driving environment be handled by a system while the fallback performance of dynamic driving tasks be the responsibility of a human driver.

Figure 4:
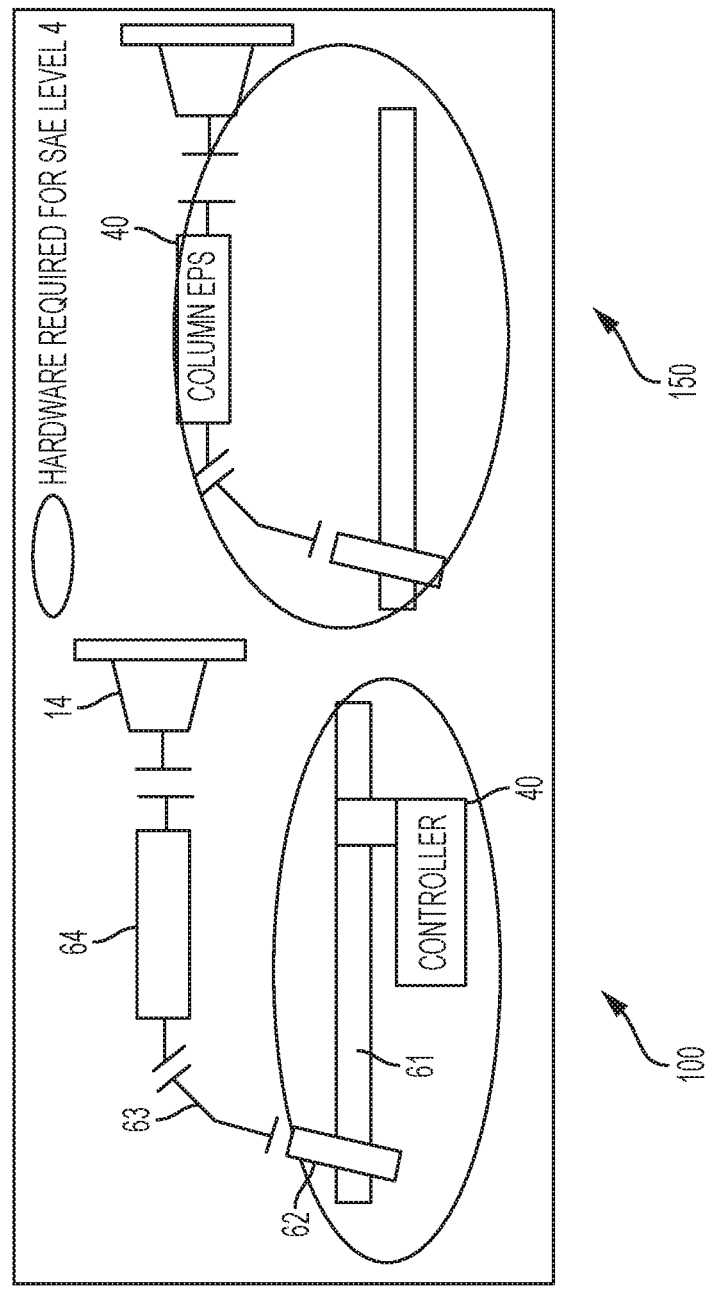
FIG. 4 illustrates an overview of a rack-based electric power steering (EPS) system and a column-based EPS system according to one or more embodiments.

FIG. 4 illustrates an overview of a rack-based electric power steering (EPS) system 100 and a column-based EPS system 150 according to one or more embodiments. In the rack-based EPS system 100 a controller 40 uses signals from the rack to provide motor assist, and in the column-based EPS system 150 the controller 40 uses signals from/to the column to provide motor assist. Typically, a rack-based EPS system 100 is used for higher output EPS applications (SUV, FST, LCV), where the motor assist is in line with the steering rack (underhood) between the road wheels. Whereas, a column-based system 150 is typically used for smaller vehicles (segments A-C) and the motor assist is integrated into the steering column (in cabin) which transmits force through the I-shaft and into the steering linkage.

If the rack EPS system 100 receives an autonomous command over a controller area network (CAN) bus (not shown) from a vehicle subsystem, such as an electronic control unit (ECU) (not shown), any motion to the rack 61 causes a reaction in pinion 62, I-shaft, column 64 and handwheel 14 in the rack-based system 100. For this configuration, change of motion in the 'idle' hardware will create a negative torque reading on the torsion bar (due to inertia) that will oppose the desired direction and subtract from system direction. In a Level 3 system, which supports conditional automation, the driver input hardware, such as the handwheel 14 causes inertial impacts on the EPS system 100. In Level 4, the EPS system 100 operates in autonomous control mode, the steering hardware for Level 4 autonomy contradicts what exists today and what is Level 3 demands For example, the inertial impacts from the driver input hardware (handwheel) 14 in Level 3 EPS systems can affect performance in the Level 4 EPS system.

Similar challenge exists in the column EPS system 150. For example, in the column-based EPS system 150, the handwheel 14 itself causes non-desired inertia effects (negative inertial performance), which in the rack-based configuration is caused by the combination of the I-shaft, the column 64 and the handwheel 14. It should be noted that the technical solutions described herein address the challenges of the negative inertial performance in either configuration, rack-based or column-based.

Further, diagnostics present a challenge for the EPS system 12 to adapt to the Level 4 autonomy standards. Consider the rack EPS system of FIG. 4. For the EPS system 100 to function in a Level 3 mode of conditional autonomy, torque sensor diagnostics are used to ensure that a human driver can intervene (via torque sensor) as a fallback driving opportunity, and thus, diagnostics must be functional and fault-free). If and when that same set of hardware is functioning in the Level 4 autonomous mode, a triggered torque sensor diagnostic may potentially inhibit assist if it is not rationalized accurately.

Accordingly, the technical solutions described herein facilitate an EPS system 12 to determine the mode of operation (for example, Level 3, Level 4 and so on) and further transition from one mode to another.

Figure 5:
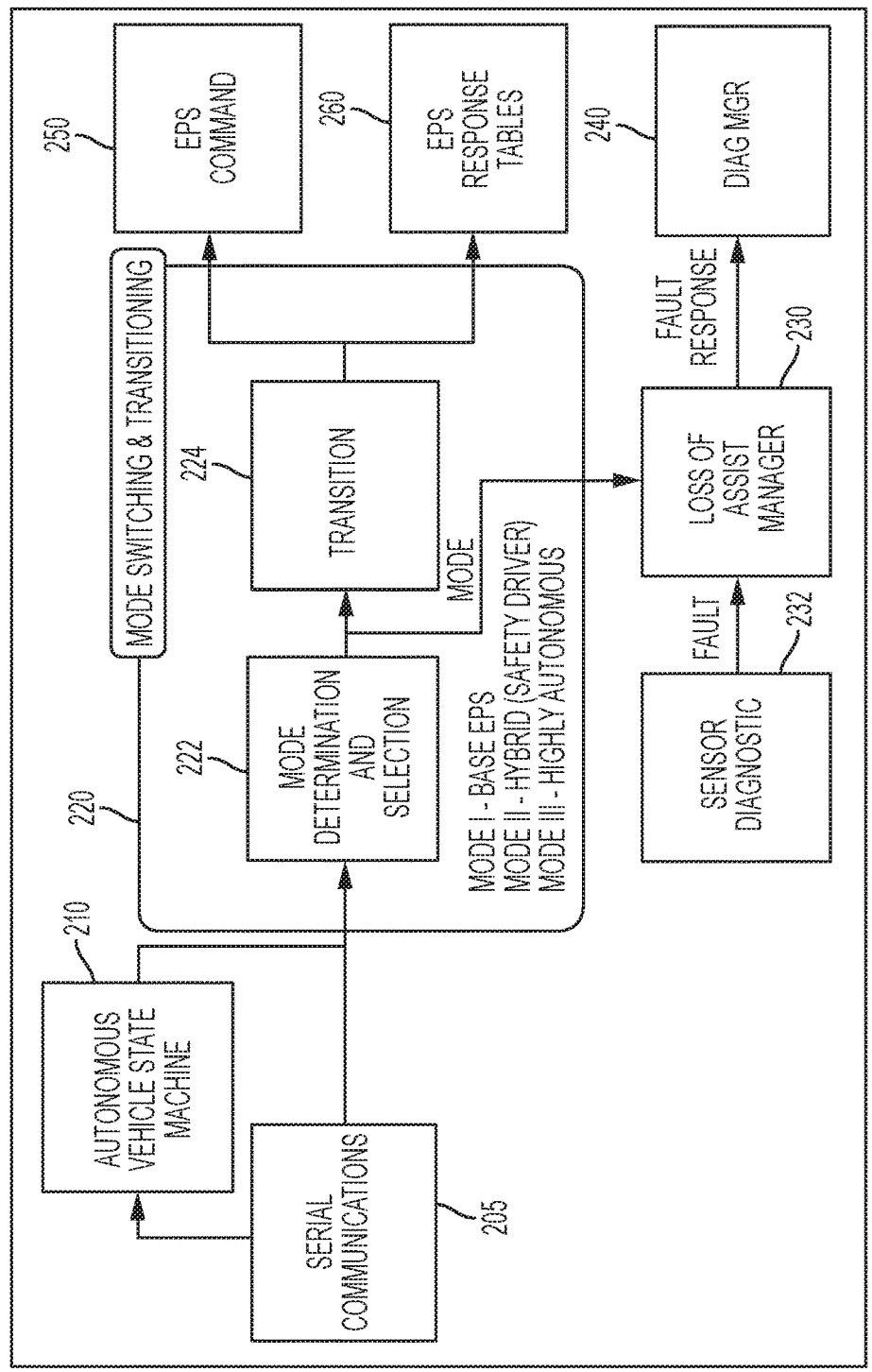
FIG. 5 illustrates a block diagram for determining steering mode and transitioning between the steering modes according to one or more embodiments.

FIG. 5 illustrates a block diagram for determining steering mode and transitioning between the steering modes according to one or more embodiments. Steering mode may also be referred to as an operating mode, or an operation mode, and is indicative of a level of autonomous driving being used by the vehicle that is equipped with the EPS system 12. The EPS system 12 receives vehicle operation information from a variety of sources. For example, the EPS system 12 receives information from overlay handler inputs, diagnostic configuration services, CAN signals from the vehicle 10 or a vehicle autonomy kit 210, and native EPS signals (for example, handwheel torque, motor position, motor velocity, motor torque command) and so on. In one or more examples, such information is received by the EPS system 12 in the form of one or more serial bus communication signals 205. It should be noted, that in other examples the information may be received in other form, such as parallel communication, wireless communication, and the like.

The vehicle autonomy kit 210 is a vehicle subsystem that sends instructions regarding operating mode. For example, the vehicle autonomy kit 210 receives instructions from an operator, for example via a user-interface to switch from one operating mode to another, for example, driver-based mode to autonomous mode. In response, the vehicle autonomy kit 210 sends corresponding instructions to the one more vehicle subsystems of the vehicle 10, including the EPS system 12, indicating the requested operation mode by the operator. In one or more examples, the vehicle autonomy kit 210 is proprietary to the vehicle manufacturer and issue instructions to the EPS system 12 using a predetermined protocol and/or standard format.

The EPS system 12, for example as part of the control module 40, includes a advance driver assist module 220. In one or more examples, based on the received information, the advance driver assist module 220 determines a current mode of operation and a requested new mode of operation. For example, the advance driver assist module 220 determines that the vehicle 10 is operating in Mode I—Base EPS mode, in which the EPS system 12 delivers performance in SAE Level 0, which is no automation. Further, in Mode II—Hybrid mode, in which the EPS functions in SAE Level 3, which is conditional automation, where the operator can take over the operation of the EPS system 12 using the handwheel 14. Further yet, Mode III—a highly autonomous mode, in which the EPS system 12 functions in SAE Level 4 that is complete autonomy, where the operator cannot take over the control of the steering using the handwheel 14. Based on determining the operating mode, the advance driver assist module 220 varies the performance of the EPS system 12 according to each operating mode. For example, the EPS system 12 provides different functionality (calibrations) within the different operating modes.

In one or more examples, the advance driver assist module 220 includes an operating mode monitoring module that distinguishes between the operating modes by detecting driver intervention through handwheel torque along with the state of the overlay handler. For example, the intervening handwheel torque is measured, and based on an amount of the intervening handwheel torque and a current operating mode, the operating mode monitoring module determines a new operating mode to switch to. In other examples, the operating mode monitoring module is separate from the advance driver assist module 220. Additionally or alternatively, the operating mode monitoring module is implemented by the control module 40. For example, the operating mode monitoring module monitors an amount of the operator provided torque, that is handwheel torque, to the handwheel 14 over a period of time, for example based on the torque sensor. If the operator is not providing any amount of torque to the handwheel over at least a predetermined amount of time, the operating mode monitoring module determines that the EPS system 12 is being used in an autonomous mode, mode II or mode III. Alternatively, if a continuous presence of handwheel torque (of different/same value) is detected, the EPS system 12 is being operated in a human operated mode. Alternatively, or in addition, the operating mode monitoring module monitors additional signals internal to the EPS system 12 and/or other vehicle subsystems of the vehicle 10, such as the brake subsystem. The operating mode monitoring module provides a control signal to the advance driver assist module, the control signal being indicative of the determined operating mode.

Upon determining that the operating mode is to be switched, the advance driver assist module 220 adjusts EPS commands 250 that are sent to the EPS system 12, for example an assist torque command that generates assist torque for the operator when operating the vehicle 10. The advance driver assist module 220 thus facilitates transitioning between two operating modes. For the operator, a smooth transition from a first operating mode to a second operating mode is desired. Alternatively or in addition, the operator desires to know when the transition is occurred to be aware that the advance driver assist module 220 is/is not in control of the steering. For example, the advance driver assist module 220 provides a transparent transitioning (to human driver) between operating modes by integrating two instances of sets of calibration values for the EPS system 12 that affect steering feel and by switching one or more features of the EPS system 12 ON/OFF during the transition. For example, a set of calibration values for the EPS system 12 includes one or more predetermined values used as parameters for operating the EPS system 12. For example, the set of calibration values for a first operating mode may be a calibration table 260 that includes one or more parameter values to apply to the EPS system operation in that operating mode. For example, the parameters may include the ability to define assist efforts, damping commands and active return functionality.

In one or more examples, separate calibration tables 260 are defined for each of the operating modes, such as Mode I and Modes When the advance driver assist module 220 detects a transition is from one operating mode to another, the advance driver assist module 220 initiates a transition module 224 to determine the calibration parameters to use for the operating the EPS system 12 during the transition. In one or more examples, the transition module 224 determines a blend factor to use during the transition from one set of tables to the another from the calibration tables 260. In one or more examples, the transition module 224 further shuts off specific features of the EPS system 12 during the transition. In one or more examples, the transition module indicates completion of the transition using a state variable, such as a flag, or any other variable, at a predetermined memory location. The advance driver assist module 220 ensures that a new mode transition request is processed only when the EPS system 12 is not already in transition using the state variable.

In one or more examples, the state variable, along with the operating mode information, is passed to an assist manager module 230 that manages assist based faults. Based on the input, the assist manager module 230 determines a fault response for diagnostics that are unique between the operating modes. For example, if a sensor diagnostic module 232 detects a faulty sensor, for example a torque sensor, the sensor diagnostic module 232 indicates the fault to the assist manager 230. For example, the diagnostic module 232 indicates the fault to the assist manager 230 by sending a corresponding control signal to the assist manager 230. In response, the assist manger 230 determines a fault response. The assist manager 230 communicates the fault response to a diagnostic manager 240, which further adjusts the operation of the EPS system 12 based on the fault response.

For example, the fault response may include determining motor torque command in a different way in view of the faulty sensor. Alternatively, or in addition, the fault response may include providing feedback to the operator of the vehicle 10. For example, the operator feedback may include a vibration at the handwheel 14. However, such an operator feedback is provided only if the operator is using the handwheel, and in an autonomous mode of operation, such feedback does not reach the operator. Accordingly, the assist manager 230 determines the type of fault response to provide based on the operating mode so that the operator is made aware of the situation. For example, the assist manager 230 may cause the diagnostic manager 240 to provide a feedback via a display, lights, audible beeps, or other kinds of user interface of the vehicle 10.

Figure 6:
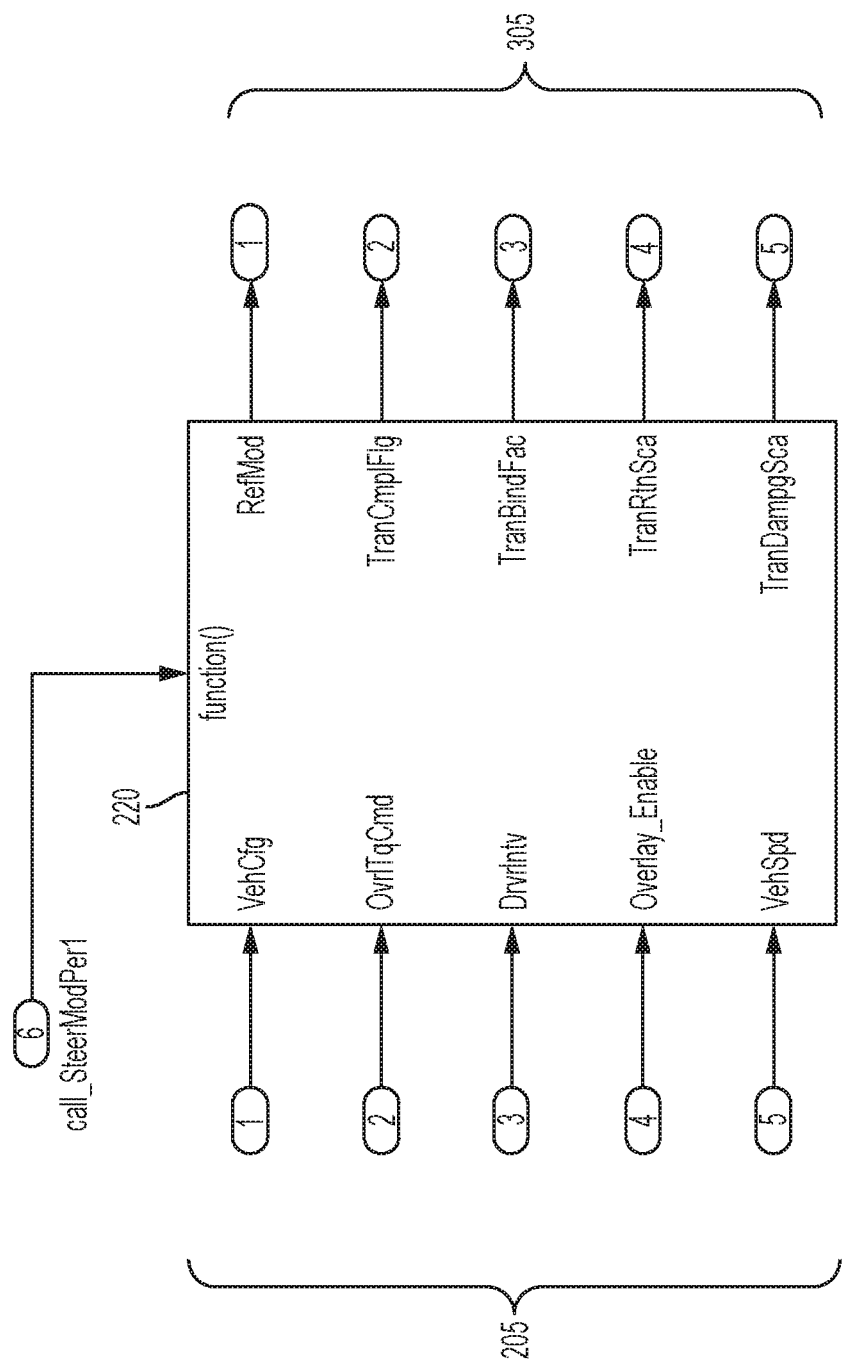
FIG. 6 depicts a block diagram for an example implementation of the advance driver assist module according to one or more embodiments.

FIG. 6 depicts a block diagram for an example implementation of the advance driver assist module 220 according to one or more embodiments. The advance driver assist module 220 receives multiple inputs 205 and generates multiple output signals 305. In one or more examples, the input signals 205 and the output signals 305 are serial communications.

The input signals 205 include a command to switch the operating mode of the EPS system 12 to a new operating mode. The input signals 205 further include a vehicle configuration. The vehicle configuration refers to a fallback control configured for the vehicle 10. For example, if there is a safety driver is present (=0) or if no safety driver and the EPS is responsible for fallback control (=1). Thus, vehicle configuration signal being in state '1' corresponds to a 'driverless' or fully automated state in the above example. It should be noted that in other examples, the vehicle configuration signal may have other values corresponding to different states than those in the above example. The input signals 205 further include an overlay torque command and further a control signal indicating whether overlay torque is enabled. The overlay torque is an EPS assist determined for the torque generated from the vehicle advance driver assist module 220, as opposed to an EPS assist generated for the torque from a manual operator. The input signals 205 further include a driver intervention signal that indicates if an operator is attempting to intervene an autonomous operation of the vehicle by taking over control of the EPS system 12 (Level 3). For example, the driver intervention signal may be received based on an amount of handwheel torque being above a predetermined threshold for each specific operating mode. For example, the in Level 1, a first predetermined threshold may be used, which is different than a second predetermined threshold in Level 2, to determine a desire to switch operating modes. The input signals 205 further include a vehicle speed signal. It should be noted that additional, different, or fewer input signals 205 may be provided in other examples.

In one or more examples, the advance driver assist module 220 provides status information, such as current operating mode, the mode that is being switched to, one or more parameters being used, and the like in response to corresponding queries from the other components of the vehicle. For example, such responses may be provided via an application programming interface (API).

The output signals 305 include an indication of the mode in which the EPS system 12 is operating. The output signals 305 further include the state variable indicating whether transition from one operating mode of the EPS system 12 to another operating mode is complete. The output signals 305 further include a scaling factor that affects damping of the EPS system 12. The damping scaling factor is used to adjust the torque command that is provided by the EPS system 12, the torque command indicative of an amount of torque that the EPS system 12 applies for completing a maneuver of the vehicle 10, such as turning. The output signals 305 further include scaling factor for other types of control signals that the EPS system 12 generates, such as a scaling factor to modify an active return functionality of the handwheel 14. Active return brings the vehicle back to a 'trimmed' zero position, the magnitude of the active return command depending upon current handwheel position and vehicle speed. When the scaling factor is set to 0, the active return functionality is disabled or inactive. The output signals 305 further include blending factor(s) for the one or more calibration tables 260 to facilitate transitioning the EPS system 12 from one operating mode to another.

Figure 7:
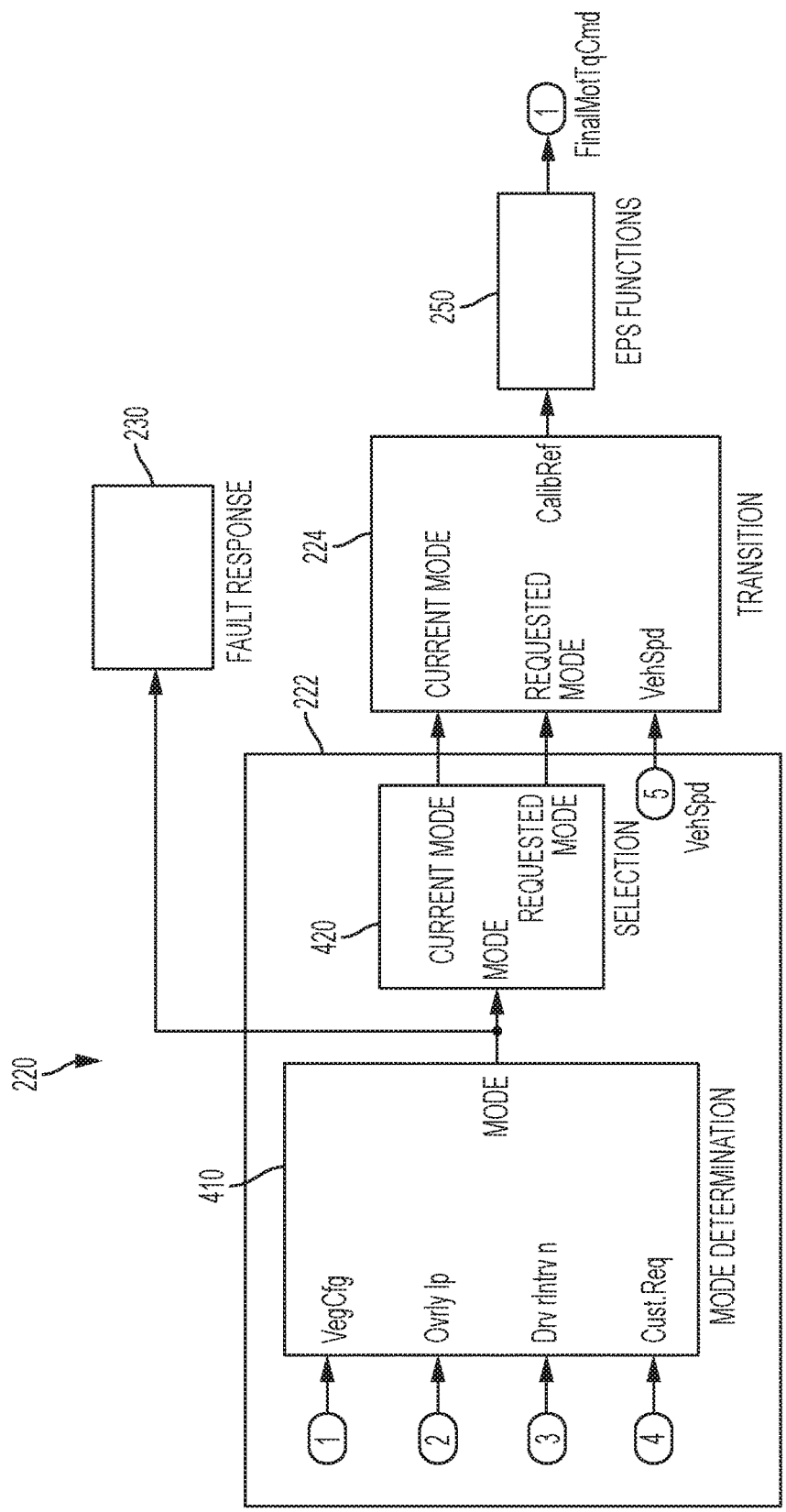
FIG. 7 depicts a block diagram of example components of the advance driver assist module according to one or more embodiments.

FIG. 7 depicts a block diagram of example components of the advance driver assist module 220, according to one or more embodiments. The components may be hardware components such as electronic circuits, and processing units that can execute one or more computer executable instructions. For example, the advance driver assist module 220 includes a mode determination and selection module 222. The mode determination and selection module 222 further include a mode determination module 410, and a mode selection module 420. The advance driver assist module 220 further includes the transition module 224.

The mode determination module 410 determines if a new operating mode for the EPS system 12 is being requested. For example, the mode determination module 410 receives the input signals 205 such as the vehicle configuration, the overlay torque, the driver intervention, a vehicle speed, and an operator request for switching the vehicle operating mode. The mode determination module 410 determines the operating mode for the EPS system 12 based on these input signals and the current operating mode of the EPS system 12.

Figure 8:
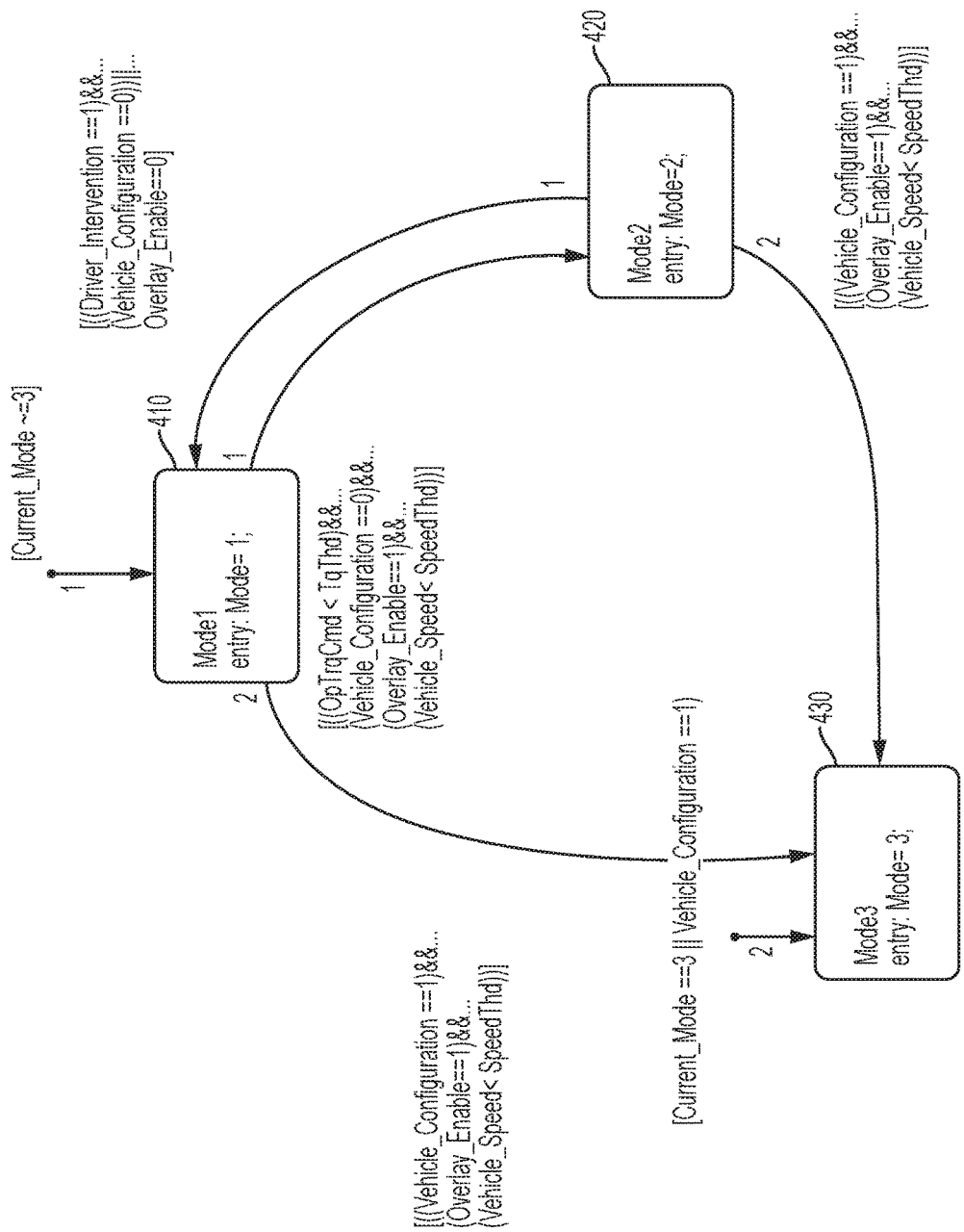
FIG. 8 depicts an example logic used by the mode determination module according to one or more embodiments.

FIG. 8 depicts an example logic used by the mode determination module 410 according to one or more embodiments. The example logic is implemented in the form of computer executable instructions and/or electronic circuits, such as application specific integrated circuits (ASIC), field programmable gate array (FPGA), and the like. For example, if the current operating mode is a first mode, the mode determination module 410 determines that the operating mode of the EPS system 12 should be changed to a third mode if the vehicle configuration=1, overlay enable=1, and the vehicle speed is below a predetermined speed threshold, as shown at 510 and 530. In a similar manner, as shown at 520 and 530, if the current operating mode is a second mode, the mode determination module 410 determines that the operating mode of the EPS system 12 should be changed to the third mode if the vehicle configuration=1, overlay enable=1, and the vehicle speed is below the predetermined speed threshold.

Here, vehicle configuration and overlay enable being equal to 1 represents the control signals being of a predetermined value indicative of the vehicle being operated in an autonomous manner, without human operator intervening with steering the vehicle 10. The vehicle configuration and overlay enable signals being equal to 0 are indicative that the highly autonomous mode is not being requested and/or used.

Further, if the current operating mode of the EPS system 12 is the first mode, the mode determining module 410 determines a switch to the second mode if an operator torque command has a value below a predetermined torque threshold, the vehicle configuration=1, the overlay enable=1, and the vehicle speed is less than the predetermined speed threshold, as shown at 510 and 520. Further yet, if the current operating mode of the EPS system 12 is the second mode, the mode determining module 410 determines a switch to the first mode if a driver intervention is detected, the vehicle configuration=0, and the overlay enable=0, as shown at 520 and 510.

In the depicted example, the mode=1 is the human operator mode, mode=2 is a hybrid mode where the operator may intervene to regain control by beginning to maneuver the handwheel 14, and the mode=3 is the highly autonomous mode where the vehicle 10 is operated without any human intervention. In one or more examples, if the vehicle 10 starts in the highly autonomous mode by default, the vehicle configuration and current mode are set to the third mode as shown at 530. Alternatively, or in addition, if the vehicle 10 starts in the human operator mode, the EPS system 12 is started in the first operating mode, as shown at 510.

Referring back to FIG. 7, the mode determination module 410 indicates, to the mode selection module 420, the new mode to which the EPS system 12 is to be switched. The mode selection module 420 generates a mode transition command that it forwards to the transition module 224. In one or more examples, the mode selection 420 also indicates the current mode of the EPS system 12 to the transition module 224.

The transition module 224 receives the information from the mode selection module 420 and in further conjunction with the vehicle speed, initiates switching the operating mode of the EPS system 12 from the current mode to the new mode that is requested.

Figure 9:
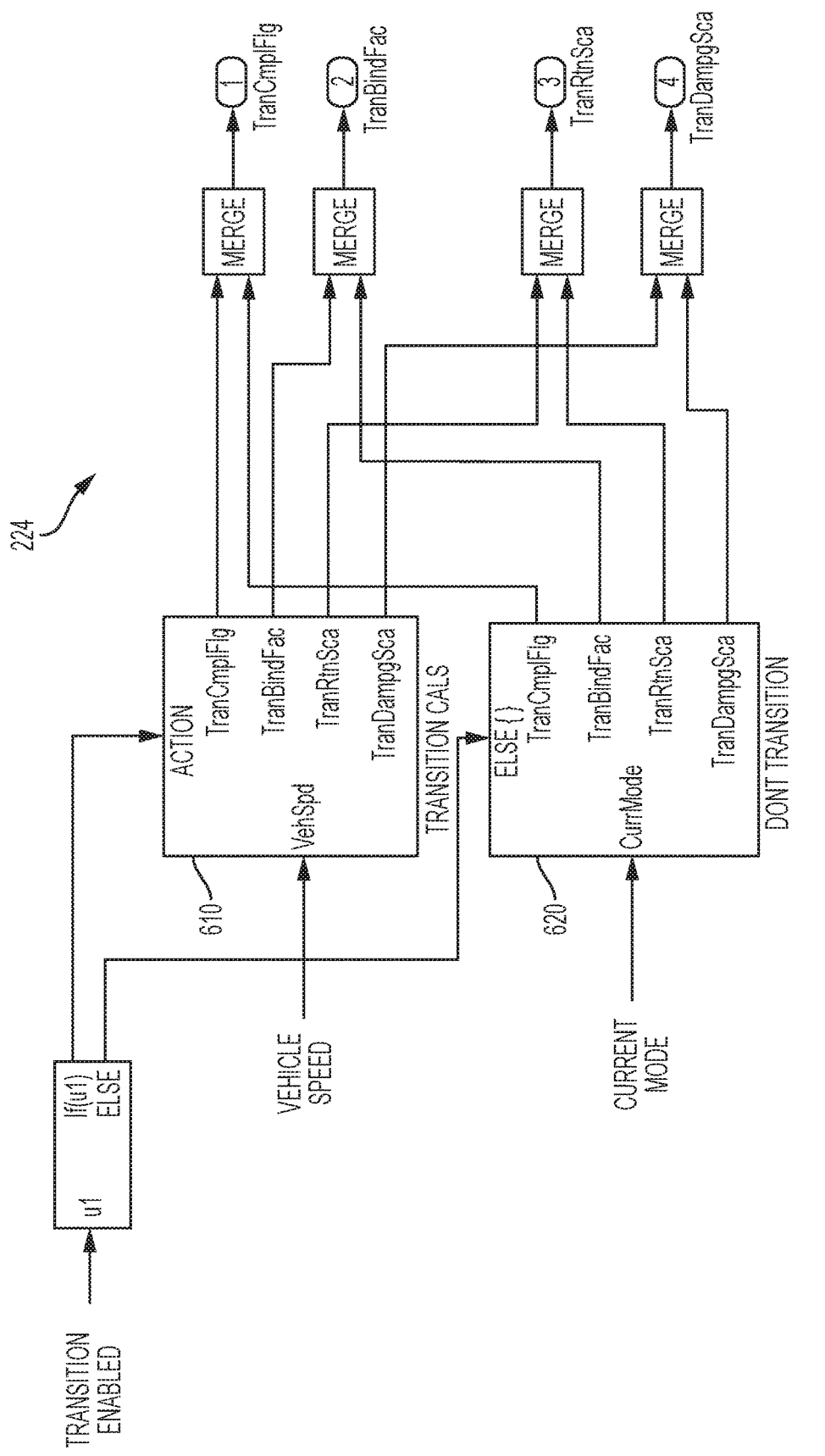
FIG. 9 depicts an example dataflow for the transition module according to one or more embodiments.

FIG. 9 depicts an example dataflow for the transition module 224 according to one or more embodiments. The transition module 224 determines if a transition or a switch from one operating mode of the EPS system 12 to another operating mode is to be performed based on the current mode and the requested mode received from the mode selection module 420. If the two modes are the same, no transition is required. In this case, as depicted in FIG. 9, the no-transition module 620 provides, as output, the values for output signals corresponding to the current operating mode of the EPS system 12. For example, the blending factor may be a predetermined value (for example 1) such that the predetermined calibration factors from the calibration tables 260 are used without adjustment. Further, the scaling factors, such as a damping scaling factor, and the active return scaling factor, are set to predetermined values corresponding to the current mode. Further yet, the transition completion state variable is set to a value indicative of transition being completed. Accordingly, a mode switching may be performed, if requested.

Alternatively, if the two received modes, the current mode and the requested mode are different, a transition is to be performed. In this case, a transition calculation module 610 switches off one or more modules/computations of the EPS system 12, such as the active return and active damping. In one or more examples, the transition calculation module 610 sets flags associated with such EPS modules/computations to an OFF state so that those modules/computations are bypassed during the transition. The flags are set back to the ON position once the transition is complete, for example in conjunction with or after the completion state variable is set to indicate completion of the transition.

Further, the transition calculation module 610 receives the vehicle speed and adjusts one or more scaling factors for the EPS system 12 according to the vehicle speed for the modules/computations that are not being bypassed during the transition. For example, the assist torque being provided by the EPS system 12 changes as the EPS system 12 is being transition from a human operated mode to an autonomous mode. For example, the assist torque that is provided in the human operated mode may be reduced to a minimum amount, such as zero in the autonomous mode. In one or more examples, transition from the human operated mode to the autonomous mode may be performed without a smooth transition in the scaling factors, while the transition from the autonomous mode to the human operated mode is performed in the smooth manner to avoid the human operator experiencing sudden jerks. In other examples, the smooth transition is performed irrespective of the modes being transitioned from/to.

In one or more examples, the transition calculation module 610 computes a blending factor that walks from one set of calibration tables 260 to the other. As described herein, each operating mode is associated with unique tuning calibration tables 260, for example for modes I, II, and III. The blending factor facilitates a smooth transition of the calibration factors from the current mode to the requested mode. In one or more examples, the blending factor determined by the transition calculation module 610 is based on the vehicle speed. For example, the transition calculation module 610 uses a lookup table based on the vehicle speed to determine the blending factor.

In one or more examples, the blending factor is used to scale the calibration factor. For example, the blending factor may be a value between 0 to 1, or a percentage value (0-100%), or any other scaling factor to transition from the current mode to the requested mode. Once the blending factor reaches a predetermined maximum value, for example 1, the transition to the requested mode is deemed completed. In response, the current mode of the EPS system 12 is set as the requested mode, and the completion state variable indicates that the transition is now complete. Further, any EPS modules/computations that may have been shut off, are switched back ON.

The merge modules 530 depicted in FIG. 9 use one of the outputs from either the transition calculation module 610 or the no-transition module 620 based on whether the transition is enabled.

Referring back to FIG. 7 the blending and scaling factors from the transition module 224 are used by the EPS system 12 to perform EPS functions 250, for example to generate a torque command to maneuver the vehicle 10, to generate an operator feedback, to generate assist torque, and the like.

Figure 10:
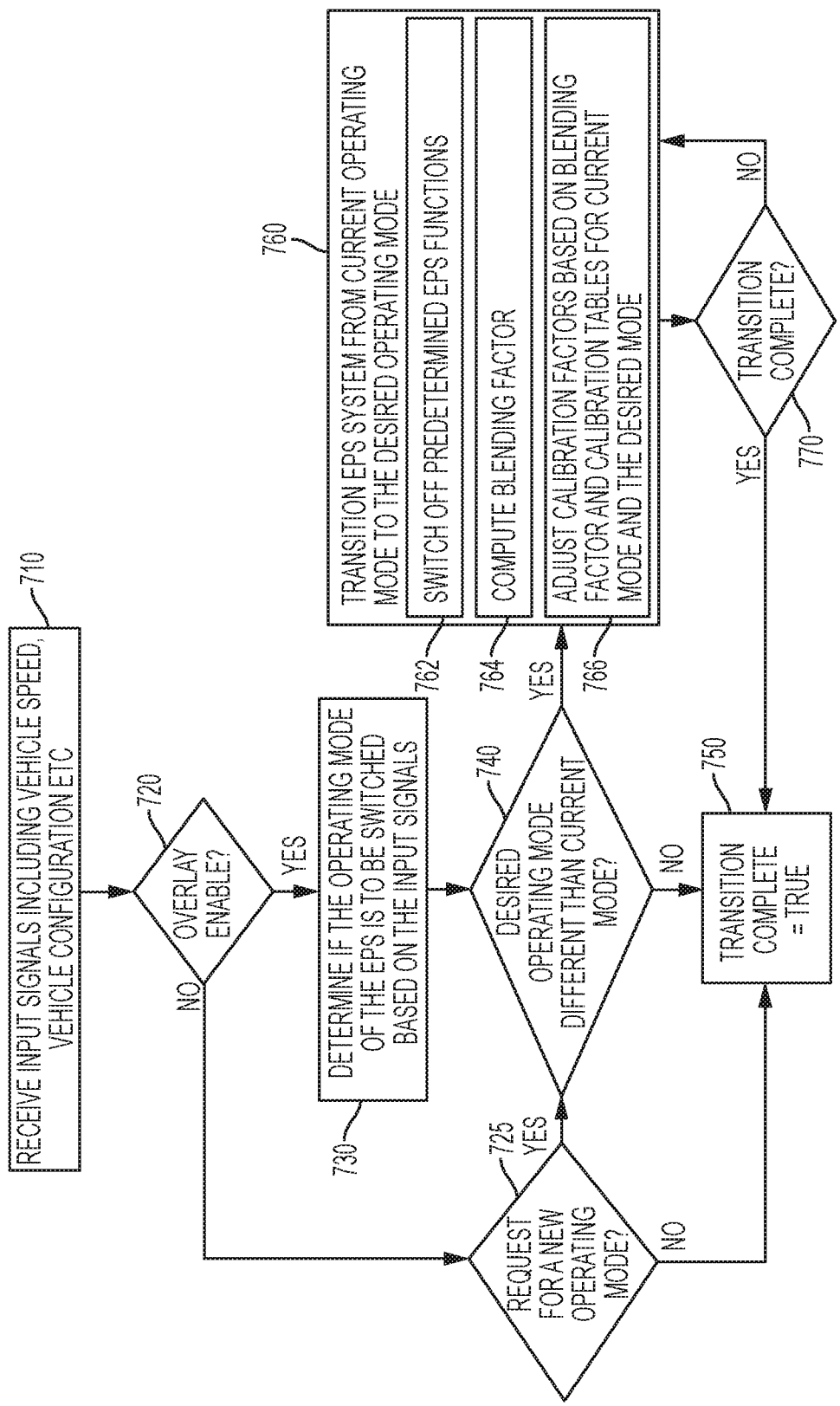
FIG. 10 depicts a flowchart for an example method for determining and transitioning an EPS system from one operating mode to another according to one or more embodiments.

FIG. 10 depicts a flowchart for an example method for determining and transitioning the EPS system 12 from one operating mode to another according to one or more embodiments. In one or more examples, the method is implemented by the advance driver assist module 220. The advance driver assist module 220 receives the input signals 205 including vehicle speed, vehicle configuration etc., as shown at 710. The advance driver assist module 220 determines if it can control features of the EPS 12, (for example, position control command from vehicle network (=1) rather than driver input command control (=0)) and switch between one operating mode to another, as shown at 720. If the automatic switching is enabled, the advance driver assist module 220 determines an EPS operating mode corresponding to the input signals 205, as shown at 730 (see FIG. 8).

If automatic determining and switching of operating mode is not enabled, the advance driver assist module 220 waits for a request to switch the operating mode, as shown at 725. For example, the request may be received from an operator of the vehicle via a user interface, such as a button, touchscreen, voice command, or any other user interface. Alternatively, or in addition, the request may be received from another vehicle components, such as the vehicle computer.

If the determined/requested desired operating mode is the same as the current operating mode, the advance driver assist module 220 maintains a transition complete state, as shown at 740 and 750. In the transition complete state, the EPS system 12 continues operating using calibration factors from the calibration tables 260 corresponding to the current operating mode, without any adjustment to the calibration factors. Until an operating mode is to be switched the advance driver assist module 220 maintains a transition complete state, as shown at 750.

If the determined/requested operating mode is different from the current operating mode of the EPS system 12, the advance driver assist module 220 initiates a transition from the current operating mode to the desired operating mode, as shown at 760. In one or more examples, the advance driver assist module 220 does not initiate a transition in case of an ongoing transition, which is indicated by the completion state variable. Further yet, in one or more examples, the advance driver assist module 220 may not automatically determine a desired mode or disable receiving a desired operating mode during an ongoing transition.

The transition includes shutting off one or more EPS functions, as shown at 762. The functions that are shut off are from a predetermined set of EPS functions that are to be disabled from the current operating mode.

Further, the transitioning includes performing a smooth transition from the current mode to the desired mode to prevent the human operator from experiencing any sudden changes or jerks. Accordingly, the transitioning includes computing a blend factor, as shown at 764. The blend factor is further used to adjust calibration factors based on calibration tables for the current mode and the desired mode, as shown at 766.

In one or more examples, the blend factor is a percentage value and the EPS system 12 blends calibration factors from a first calibration table for the current operating mode and from a second calibration table for the new operating mode based on the percentage value. For example, if the blend factor is 40%, the EPS system 12 computes a calibration factor as (40%×first calibration factor)+(60%×second calibration factor). Alternatively, in another example, the EPS system 12 computes a calibration factor as (60%×first calibration factor)+(40%×second calibration factor).

In one or more examples, the blend factor is determined based on the vehicle speed during the transition. In one or more examples, once the blend factor reaches 100%, or 0%, or any other predetermined value, the transition is deemed to be complete and calibration factors from the second calibration table associated with the new operating mode is used by the EPS system 12. Further, the transition mode is set to be complete, as shown at 750.

Figure 11:
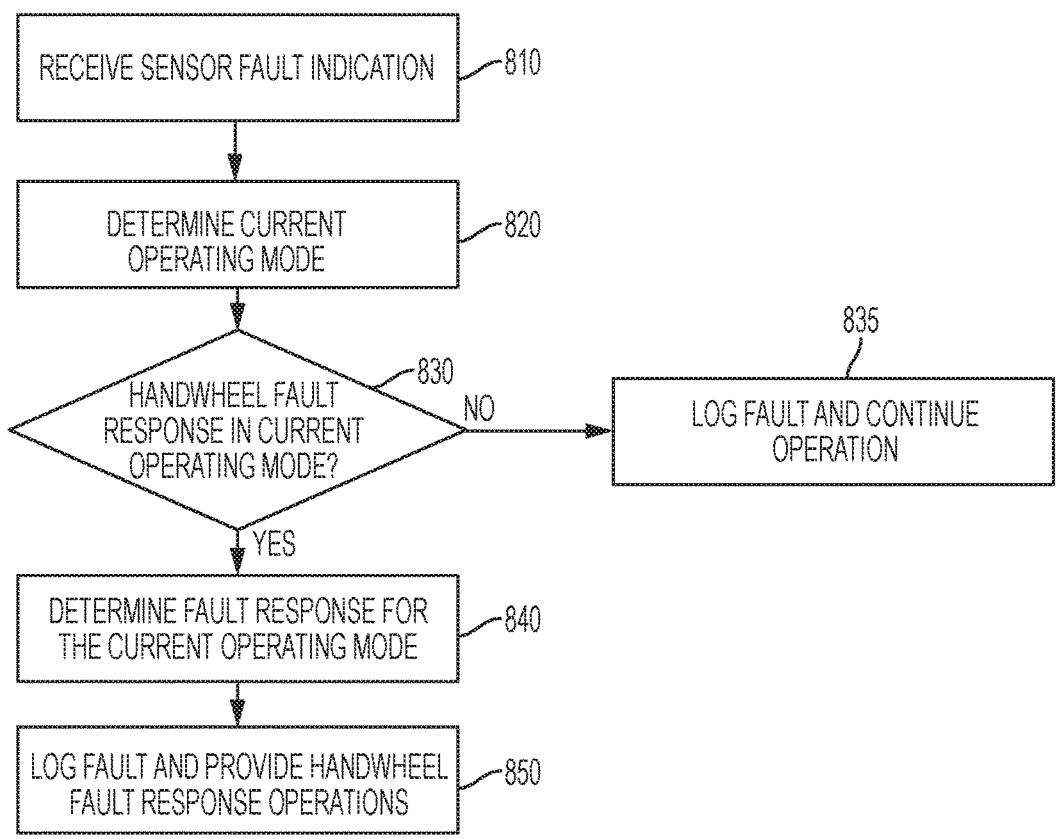
FIG. 11 depicts a flowchart for an example method for fault response according to one or more embodiments.

FIG. 11 depicts a flowchart for an example method for fault response according to one or more embodiments. In one or more examples, the assist manager module 230 performs the method. The assist manager module 230 receives a sensor fault indication, for example a torque sensor fault, as shown at 810. The assist manager module 230 determines the current operating mode of the EPS system 12, as shown at 820. In one or more examples, the current operating mode is indicated to the assist manager module 230 by the advance driver assist module 220. The assist manager module 230 determines if a handwheel fault response is to be performed for the current operating mode, as shown at 830. For example, if the EPS system 12 is being operated in highly autonomous mode, a torque sensor failure is not reported to the operator via the handwheel 14. In such a case, the assist manager module 230 logs the fault for later indication to the operator, as shown at 835. Alternatively, or in addition, the assist manager module 230 indicates a visual/audible feedback to the operator via a display, such as a screen, light bulb, or other indicators on the vehicle dash.

If a fault response is to be performed, for example if the EPS system is being operated in a human operator mode, the assist manager module 230 determines the fault response to be performed, as shown at 840. For example, the fault response may include providing a feedback torque to the operator via the handwheel, so that the handwheel 14 vibrates. The assist manager module 230 logs the fault and provides the handwheel fault response operations, as shown at 850. In one or more examples, the assist manager module 230, in addition, provides other feedback via the vehicle dash as described herein.

The technical solutions herein facilitate automatically determining a change in operating mode of an EPS system based on vehicle configuration, operator interaction with a handwheel, vehicle speed, and the like. In addition, the technical solutions facilitate transitioning an EPS system from one operating mode to another based on the automatically determined operating mode. Further, the transition may be performed in response to a request to switch operating modes from the operator. The transitioning facilitates a smooth transition from one mode to the other by computing a blend factor that adjusts the calibration factors for the EPS functions based on predetermined calibration factors for the two modes. Further yet, the technical solutions described herein facilitate managing diagnostic errors received from one or more sensors based on the operating mode of the EPS system.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. An electric power steering system comprising:
an advance driver assist module configured to:
  determine an operation mode that indicates a level of autonomous driving, the operation mode being a first operation mode from a plurality of levels of autonomous driving comprising at least a fully automated operation mode, a semi-automated operation mode, and a non-automated operation mode;
  detect a change from the first operation mode to a second operation mode; and
  transition performance of the electric power steering system from the first operation mode to the second operation mode, the transitioning comprising:
    determining a blend factor for adjusting the performance of the electric power steering system that is operating using a first calibration factor of the first operation mode to a second calibration factor of the second operation mode, the blend factor based on a vehicle speed;
    scaling the second calibration factor using the blend factor; and
    generating a steering system command using the scaled second calibration factor.

2. The electric power steering system of claim 1, wherein determining the operation mode is based on an amount of intervening handwheel torque measured during operation.

3. The electric power steering system of claim 1, wherein detecting the change from the first operation mode to the second operation mode is based on a change in a vehicle configuration, and an amount of intervening handwheel torque, at a vehicle speed that is below a predetermined speed threshold.

4. The electric power steering system of claim 1, further comprising a control module configured to generate the steering system command, which comprises a motor torque command using the scaled second calibration factor.

5. The electric power steering system of claim 1, wherein transitioning the performance comprises:
switching off an EPS function.

6. The electric power steering system of claim 1, wherein the first operation mode is one of a human operator mode or a hybrid mode and the second operation mode is an autonomous mode.

7. The electric power steering system of claim 1, wherein the first operation mode is a human operator mode and the second operation mode is a hybrid mode.

8. The electric power steering system of claim 1, wherein the first operation mode is a hybrid mode and the second operation mode is a human operator mode.

9. The electric power steering system of claim 1, wherein transitioning the performance comprises:
setting a value of a transition-complete flag based on the blend factor, the transition-complete flag being set to TRUE based on the blend factor exceeding a maximum threshold, and set to FALSE otherwise.

10. An advance driver assist module for an electric power steering system, which is configured to:
determine an operation mode that indicates a level of autonomous driving, the operation mode being a first operation mode from a plurality of levels of autonomous driving comprising at least a fully automated operation mode, a semi-automated operation mode, and a non-automated operation mode;

detect a change from the first operation mode to a second operation mode; and transition performance of the electric power steering system from the first operation mode to the second operation mode, the transitioning comprising:

determining a blend factor for adjusting the performance of the electric power steering system that is operating using a first calibration factor of the first operation mode to a second calibration factor of the second operation mode, the blend factor based on a vehicle speed;

scaling the second calibration factor using the blend factor; and generating a steering system command using the scaled second calibration factor.

11. The advance driver assist module of claim 10, wherein determining the operation mode is based on an amount of handwheel torque.

12. The advance driver assist module of claim 10, wherein detecting the change from the first operation mode to the second operation mode is based on a change in a vehicle configuration, and an amount of handwheel torque, at a vehicle speed that is below a predetermined speed threshold.

13. The advance driver assist module of claim 10, wherein detecting the change from the first operation mode to the second operation mode is based on a request to switch to the second operation mode.

14. The advance driver assist module of claim 10, further comprising a control module configured to generate the steering system command, which comprises a motor torque command using the scaled second calibration factor.

15. A method for providing assist signal to an electric power steering system, the method comprising:

determining an operation mode of the electric power steering system, the operation mode indicates a level of autonomous driving of a vehicle equipped with the electric power steering system, the operation mode being a first operation mode from a plurality of levels of autonomous driving comprising at least a fully automated operation mode, a semi-automated operation mode, and a non-automated operation mode;

detecting a change from the first operation mode to a second operation mode; and transitioning performance of the electric power steering system from the first operation mode to the second operation mode, the transitioning comprising:

determining a blend factor for adjusting the performance of the electric power steering system that is operating using a first calibration factor of the first operation mode to a second calibration factor of the second operation mode, the blend factor based on a vehicle speed;

scaling the second calibration factor using the blend factor; and generating a steering system command using the scaled second calibration factor.

16. The method of claim 15, wherein determining the operation mode is based on an amount of handwheel torque.

17. The method of claim 15, wherein detecting the change from the first operation mode to the second operation mode is based on a change in a vehicle configuration, and an amount of handwheel torque, at a vehicle speed that is below a predetermined speed threshold.

18. The method of claim 15, further comprising:

in response to receiving a sensor failure indication, bypassing a fault response associated with the sensor failure in response to the electric power steering system being operated in the first operation mode, which is an autonomous mode.

* * * * *